United States Patent Office 3,606,402
Patented Sept. 20, 1971

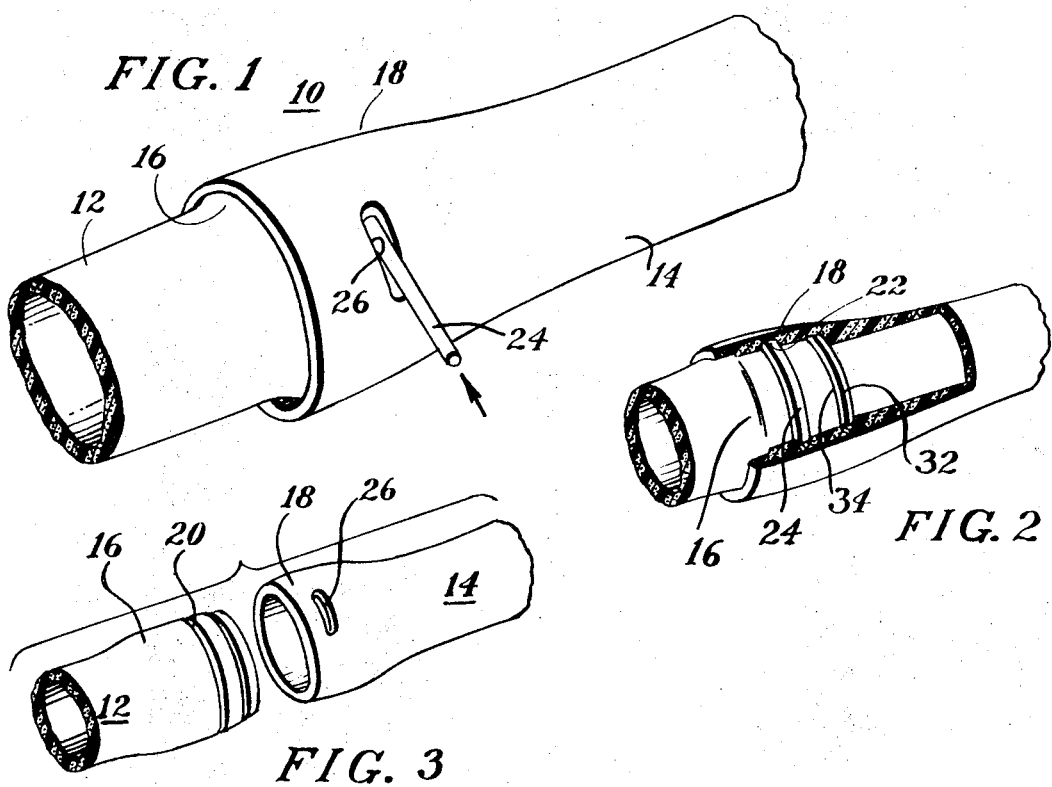
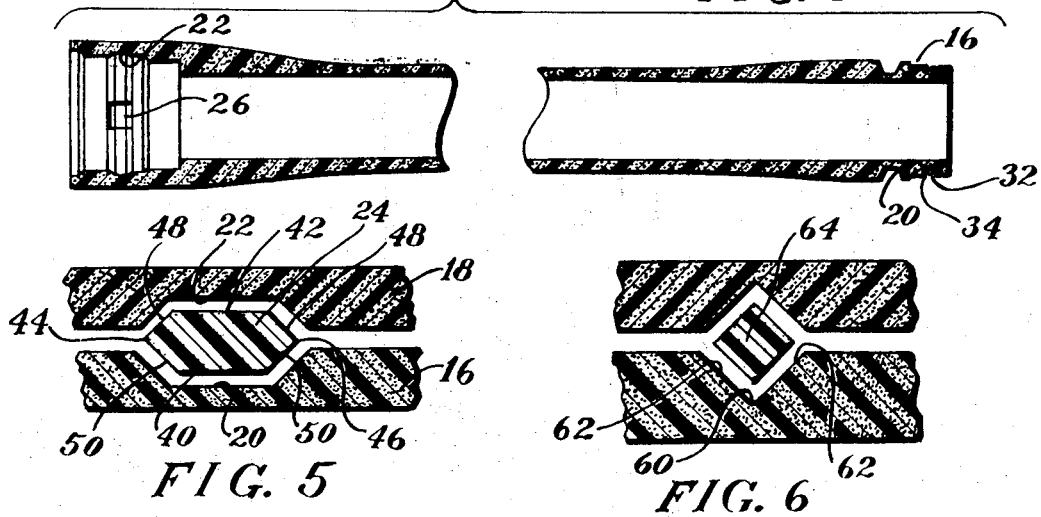

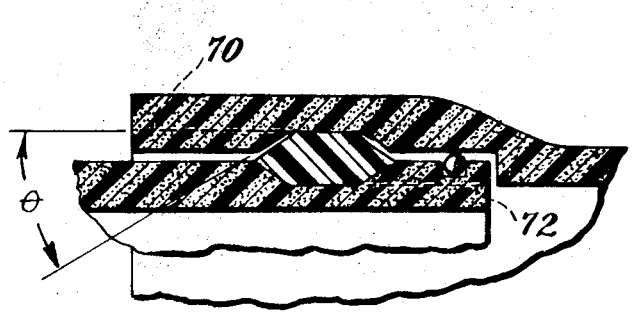
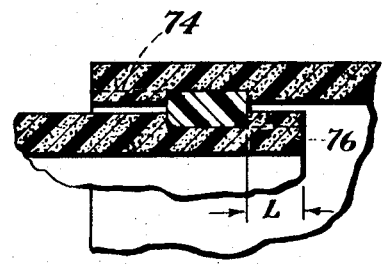
FIG. 7A
FIG. 7B
(PRIOR ART)
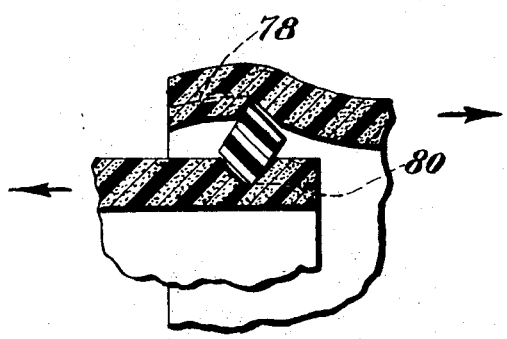
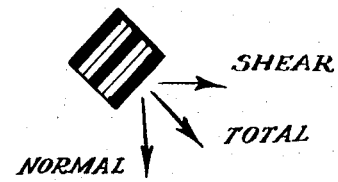
FIG. 7C
(PRIOR ART)
FIG. 7D
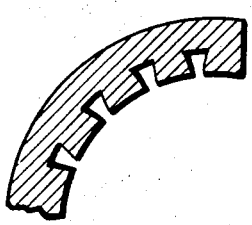
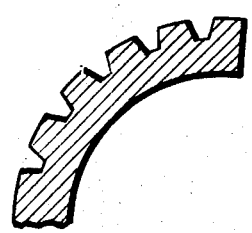
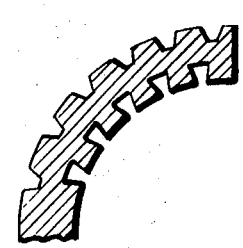
FIG. 8A     FIG. 8B     FIG. 8C
INVENTOR.
JONAS MEDNEY
BY
Leonard H King
ATTORNEY

3,606,402
LOCKING MEANS FOR ADJACENT
PIPE SECTIONS
Jonas Medney, Oceanside, N.Y., assignor to Fiberglass
Resources Corporation, Farmingdale, N.Y.
Filed July 2, 1969, Ser. No. 838,390
Int. Cl. F16l 37/00
U.S. Cl. 285—305                                                    15 Claims

ABSTRACT OF THE DISCLOSURE

A key adapted to be inserted into a channel defined by opposed grooves in telescoped pipe sections provides means for releasably locking the pipe sections to each other. The key is, in cross section, an hexagonal polygon having two surfaces that are radially spaced apart and parallel to the longitudinal axis of the pipe. The dimension between the radially spaced surfaces is less than that of the axially spaced vertices of the key. The vertices of the key are defined by side walls that are positioned at an angle not greater than 45° with respect to the longitudinal axis of the pipe.

---

This invention relates generally to glass filament wound thermo-setting resin tubular members and more particularly to improved means for locking adjacent members to each other.

BACKGROUND OF THE INVENTION

Pipes of the type to which the invention is directed are normally delivered to the installation site in several sections so that they may be ultimately coupled to each other to provide the desired length. One form of pipe coupling that is commonly used consists of bolt secured flanges on adjacent pipe sections. In certain instances, however, it is inconvenient and impractical to provide flanges on the pipe sections and for this reason pipes having their confrontingly opposed ends telescoped into each other are used. Means for locking the sections in order to prevent relative axial movement thereof must still be provided and it is to this particular problem that the present invention is directed. Further, the present invention is specifically applicable to resin bonded glass filament pipes having strength and constructional characteristics that are peculiar to the filament winding art.

In its broadest aspect the present invention provides that in a coaxially telescoped pipe joint an outwardly facing annular groove is formed on the outside end section of one pipe and an inwardly facing, similarly dimensioned groove is formed on the internal surface of the other section. A key, which in cross-section defines an hexagonal polygon, is inserted in a substantially tangential direction through an opening in the wall of the female pipe section. The key enters the channel defined by the oppositely facing grooves and thereby locks the two pipe sections to each other.

The cross-sectional configuration of the key is a particularly important consideration of this invention. As will be shown in the drawing, and described in more detail hereinafter, two parallel surfaces of the key, the planes of which are parallel to the longitudinal axis of the pipe, define a thickness that is less thna the axially spaced vertices defining the extremities of the hexagonal polygon key.

It has been found that the full strength of a filament wound glass structure can be utilized by avoiding winding of sharp corners. It will be appreciated that, by using the hexagonal polygon key of the present invention as opposed to either a diamond shaped or a rectangular key that is proposed by the prior art, the necessity of winding either one 90° angle as in the case of the diamond shaped key or two 90° angles in the case of the rectangular key is avoided. Thus, the structure of the present invention avoids the main part of the stress rise that is due to winding over sharp radii.

The present invention provides an integral, quick-connected coupling for a leak proof joint. The structure which will be described in more detail hereinafter permits fast and easy installation without any cutting, without any adhesive bonding, and without the use of special tools. The assembly or dis-assembly may be done in the field without the requirement of having highly skilled labor available.

The present invention is particularly useful for temporary lines or for use in hard-to-reach areas, as well as permanent installations. The installation may be on the surface or may be of a type such as "down-hole" casings. The precision machined male and female joint is supplied as an integral part of standard filament wound pipe lengths which are mated and locked to each other by inserting a pair of plastic or metal keys into the locking groove. When so assembled the pipe is ready for immediate service and in addition can be disassembled and reused as opposed to the use of resin bonded sections. The coupling comprising the present invention mechanically locks the joints by means of the key and groove arrangement and prohibits axial movement of the pipe sections. The strength of joints formed in accordance with the teachings of this invention meets or exceeds the strength of the pipe. O rings may be employed for sealing of the joint.

Accordingly, it is an important object of this invention to provide improved key type locking means for adjacent telescoped sections of a glass filament wound resin bonded pipe.

It is another object of this invention to provide an improved key as described above having a cross section defining an hexagonal polygon.

These and other objects, features and advantages of the invention will, in part, be pointed out with particularity and will, in part, become obvious from the following more detailed description of the invention taken in conjunction with the accompanying drawing which forms an integral part thereof.

In the various figures of the drawing like reference characters designate like parts.

DESCRIPTION OF THE DRAWING

FIG. 1 is a fragmentary, perspective view of two adjacent pipe sections showing the key means comprising the present invention prior to its insertion;

FIG. 2 is a fragmentary perspective view similar to FIG. 1 with a portion of one of the pipe sections broken away to illustrate the assembled condition of the key;

FIG. 3 is an exploded fragmentary perspective view illustrating adjacent portions of pipe sections formed in accordance with the teachings of this invention;

FIG. 4 is a fragmentary longitudinal sectional view illustrating a typical pipe section that incorporates the concept of the present invention;

FIG. 5 is a fragmentary sectional elevational view on an enlarged scale illustrating wall portions of adjacent pipe sections with the key comprising the present invention in the installed condition;

FIG. 6 is a view similar to FIG. 5 on the same enlarged scale but showing comparable elements of the prior art construction;

FIGS. 7A, 7B, 7C and 7D schematically illustrate force relationships found in the present invention and the prior art; and FIGS. 8A, 8B and 8C are sections of an alternative metal key member.

Referring now to the drawing in particular to FIGS. 1, 2 and 3, there is shown the pipe coupling and locking means comprising the present invention. Pipe assembly 10 consists of two axially adjacent pipe sections 12 and 14 that are coaxially telescoped one within the other. The male and female pipe ends 16 and 18, respectively, are provided with confronting circumferential grooves 20 and 22, respectively, in order to receive a pair of key members 24. A pair of slots 26, spaced 180° apart, are provided in the wall of the male pipe end section 14. The slots 26 are at the same axial position as the confronting grooves 20 and 22 so as to permit tangential insertion of the key members 24.

In FIG. 4 there is fragmentarily shown a typical length of pipe constructed in accordance with this invention. Since all of the pipe lengths are structurally the same except for variations in size, as required by the user, only one pipe section 12 need be described. In addition to the features described in connection with FIGS. 1, 2 and 3, the male end section 16 of the pipe includes a second annular groove 30 axially positioned intermediate groove 20 and the end of the pipe section 16. Groove 30 is arranged to receive an O-ring 32 and a backup ring 34 in order to provide a position fluid tight seal.

FIGS. 5 and 6 graphically illustrate important differences between the present invention and the prior art. Turning particularly to FIG. 5, it will be seen that a typical key member 24 defines an hexagonal polygon in cross-section. The thickness of the key member 24 is defined by the radial dimension (with reference to the center line of pipes) between axially extending inner and outer surfaces 40 and 42, respectively. The surfaces 40 and 42 extend substantially parallel to the longitudinal axis of the pipe. The thickness of the key member 24 is less than the axial dimension between the vertices 44 and 46 defined by the juncture of angular surfaces 48 and 50, respectively.

By constructing the present invention in accordance with the illustration of FIG. 5, the likelihood of cracking the pipe end section 16 in the area of wall surfaces 40 and 42 is substantially reduced. The present invention provides relatively smooth continuity between the outside diameter of the male section 16 and the bottom of the groove 20. While the key member 24 has been shown as an hexagonal polygon it should be clearly understood that the vertices need not be sharp and can, in fact, have some small radius so that adjacent surfaces of the key member 24 are blended one into the other. The groove 20 would, of course, be similarly shaped.

By way of contrast, the prior art as shown in FIG. 6 is subjected to cracking at the intersection 60 defined by the juncture of groove surfaces 62. A common and widely used key 64 is diamond shaped in cross-section so that the mating groove thereby weakens the structure, particularly the inner member of the two telescoped pipe sections.

In structure of this type, the weakest part of the pipe end section will be the lowest point of the groove therein. Should this lowest point occur at a juncture of two surfaces, such as shown in the prior art, the pipe will have materially reduced strentgh characteristics and will be subjected to berakage at that point if it is necessary for the pipe to bend in order to follow the terrain. By eliminating this weakened portion, the present invention, as shown in FIG. 5, provides a more reliable pipe joint. The present invention achieves this goal by providing a key that is an hexagonal polygon in cross section, the key mating with a similarly shaped groove.

Referring now particularly to FIGS. 7A, 7B, 7C and 7D, there is shown an analysis of the stress relations of the present invention and the prior art. It is well known that in a filament wound structure the strength in tensile, pressure loads, etc., because of the strength of the glass filaments, will run into the hundred-thousands p.s.i. range; whereas the interlaminar shear values are nearer to the four to five-thousand p.s.i. range. The normal mode of failure of the key design of the present invention shown in FIG. 7A will be along either of the two dotted lines 70 and 72. In the prior art, where a rectangular key is used, it will be seen (FIG. 7B) that the glass filaments form a series of coaxial tubes and the shear planes 74 and 76 are cylindrical. This form of construction would fail relatively early. It should be noted at this point that merely increasing the length L does not linearly increase the strength to better resist the interlaminar shear face. The diamond shaped configuration shown in FIG. 7C represents some improvements over the rectangular shape in that the female portion, which is formed in the molding operation, changes the interlaminar shear planes 78 by upsetting the glass winding and forcing the interlaminar shear planes to cut glass.

As a relative number the shear strength across the glass plane approaches 30,000 p.s.i. as opposed to an interlaminar shear of 4,000 to 5,000 p.s.i. if resistance is provided only by the resin. The rectangular embodiment shown in FIG. 7B and in the male portion of FIG. 7C provide no upset during the winding, the layers being coaxial and only the resin being used to resist shearing.

FIG. 7D is a vector diagram showing the total force divided into the shear force and the normal force. It can be demonstrated that when a force of compression on a resin plane that is perpendicular to the shear plane is applied at the same time then the shear stress resistance increases proportionately to the normal force. The present invention provides for an increased interlaminar shear strength by placing a compression load on a member being stressed interlaminally. While this would hold true of the diamond-shaped configurations as well, the present invention represents a substantial improvement over the prior art in that the 90° corners of a diamond are not used. In the present invention the angle $\theta$ shown in FIG. 7A is less than 45°.

In carrying out the present invention the angle $\theta$ is maintained at less than 45°. This results in a greater force in the vertical direction than in the horizontal direction, thus providing a compression force greater than the interlaminar shear force.

FIGS. 8A, 8B and 8C illustrate three different constructions for the locking keys which are, in each case, flexible and which may be either plastic or metal. In order to achieve the flexibility required for use, particularly with small diameter tubular members, a plurality of transverse notches may be formed in either the inner, the outer, or both the inner and the outer longitudinal edges of the key member. Thus, key 90 (FIG. 8A) includes a plurality of transverse notches 92 formed on the outer edge thereof. Key 94 (FIG. 8B) has comparable transverse notches 96 formed on the inner, longitudinal edge and key 98 (FIG. 8C) has transverse notches 100 and 102 formed on both its inner and outer longitudinal edges, respectively.

There has been disclosed heretofore the best embodiment of the invention presently contemplated and it is to be understood that various changes and modifications may be made by those skilled in the art without departing from the spirit of the invention.

What I claim as new and desire to secure by Letters Patent is:

1. A key member for releasably locking together adjacent end portions of two coaxially telescoped tubular members each of which tubular members having wall means which define a groove that in combination defines a channel to receive said key member said channel circumscribing the longitudinal axis of said tubular members, there being an opening in the wall of the outer one of the telescoped tubular member whereby said key member is inserted through the opening and into the channel, said key member comprising in transverse cross-section, a multi-sided strip having at least some of the sides thereof positioned in planes that are at an acute angle not greater than 45° to the longitudinal axis of the tubular members, at least two other sides of said strip being radially spaced apart and positioned in planes that are substantially parallel to the longitudinal axis of the tubular members, the parallel plane sides of said strip being longer than the sides of said strips that are positioned in planes at an acute angle to the longitudinal axis of the tubular members and wherein said channel is substantially complementary to said key member.

2. The key member in accordance with claim 1 wherein the sides of said strip define, in transverse cross-section, an hexagonal polygon.

3. The key member in accordance with claim 2 wherein two of the vertices of said hexagonal polygon are spaced apart axially with respect to the longitudinal axis of the tubular members, the dimension between the axially spaced apart vertices being greater than the dimension between the radially spaced apart parallel plane sides.

4. The key member in accordance with claim 2 where said strip is flexible.

5. The key member in accordance with claim 2 wherein said strip is plastic and includes a plurality of transverse notches formed in at least one longitudinal edge thereof whereby said strip is flexible.

6. The key member in accordance with claim 2 wherein said strip is metal and includes a plurality of transverse notches formed in at least one longitudinal edge thereof whereby said strip is flexible.

7. An assembly comprising:
   (a) first and second tubular members having coaxially telescoped end portions;
   (b) first wall means forming a radially outward facing circumferential groove on the outer surface of said first tubular members;
   (c) second wall means forming a radially inward facing circumferential groove on the inner surface of said second tubular member, the grooves on said first and second tubular members being in confronting relationship to thereby define a channel, said channel circumscribing the longitudinal axis of the tubular members;
   (d) at least one opening formed in the wall of said second tubular member, said opening communicating with said channel when said first and second tubular members are in the telescoped condition; and
   (e) at least one key member inserted through the opening in said second tubular member and into the channel to thereby prevent relative axial movement of said first and second tubular members, said key member comprising in transverse cross-section, a multi-sided strip having at least some of the sides thereof positioned in planes that are at an acute angle not greater than 45° to the longitudinal axis of said first and second tubular members, at least two other sides of said strip being radially spaced apart and positioned in planes that are substantially parallel to the longitudinal axis of said first and second tubular members, the parallel plane sides of said strip being longer than the sides of said strip that are positioned in planes at an acute angle to the longitudinal axis of said first and second tubular members and wherein said channel is substantially complementary to said key member.

8. The assembly in accordance with claim 7 wherein the sides of said strip define, in transverse cross-section, an hexagonal polygon.

9. The assembly in accordance with claim 8 where said key member is flexible.

10. The assembly in accordance with claim 8 wherein said first and second tubular members are made from resin bonded glass fibers.

11. The assembly in accordance with claim 8 wherein two of the vertices of said hexagonal polygon are spaced apart axially with respect to the longitudinal axis of said first and second tubular members, the dimension between the axially spaced apart vertices being greater than the dimension between the radially spaced apart parallel plane sides.

12. The key member in accordance with claim 8 wherein said strip is plastic and includes a plurality of transverse notches formed in at least one longitudinal edge thereof whereby said strip is flexible.

13. The key member in accordance with claim 8 wherein said strip is metal and includes a plurality of transverse notches formed in at least one longitudinal edge thereof whereby said strip is flexible.

14. The assembly in accordance with claim 8 wherein at least one of said tubular members includes a second circumferential groove positioned intermediate said first groove and the end of said one tubular member, there being an O-ring positioned in said second groove in sealing relationship with the confronting surface of said other tubular member.

15. The assembly in accordance with claim 14 wherein said second groove is formed in the outer surface of said first tubular member.

References Cited

UNITED STATES PATENTS

| | | | |
|---|---|---|---|
| 408,835 | 8/1889 | Grafton | 285—305 |
| 3,388,932 | 6/1968 | Bradley | 285—423X |
| 3,502,356 | 3/1970 | Schmunk | 285—47X |

FOREIGN PATENTS

| | | | |
|---|---|---|---|
| 1,310,712 | 10/1962 | France | 285—305 |
| 1,397,378 | 3/1965 | France | 285—305 |
| 390,210 | 2/1924 | Germany | 287—53L-K |
| 1,097,192 | 12/1967 | Great Britain | 285—305 |

DAVE W. AROLA, Primary Examiner

U.S. Cl. X.R.

285—423